(12) United States Patent
Jamaly

(10) Patent No.: US 12,249,760 B2
(45) Date of Patent: *Mar. 11, 2025

(54) ANTENNA SYSTEM

(71) Applicant: Swisscom AG, Bern (CH)

(72) Inventor: Nima Jamaly, Bern (CH)

(73) Assignee: Swisscom AG (CH)

( * ) Notice: Subject to any disclaimer, the term of this patent is extended or adjusted under 35 U.S.C. 154(b) by 30 days.

This patent is subject to a terminal disclaimer.

(21) Appl. No.: 17/986,951

(22) Filed: Nov. 15, 2022

(65) Prior Publication Data

US 2023/0071351 A1 Mar. 9, 2023

Related U.S. Application Data

(63) Continuation of application No. 17/034,021, filed on Sep. 28, 2020, now Pat. No. 11,532,874, which is a continuation of application No. 15/680,371, filed on Aug. 18, 2017, now Pat. No. 10,840,585.

(30) Foreign Application Priority Data

Aug. 19, 2016 (EP) .................................. 16185041

(51) Int. Cl.
| | | |
|---|---|---|
| *H01Q 1/12* | (2006.01) | |
| *H01Q 1/32* | (2006.01) | |
| *H01Q 9/40* | (2006.01) | |
| *H01Q 13/02* | (2006.01) | |
| *H01Q 21/24* | (2006.01) | |
| *H04B 7/10* | (2017.01) | |

(52) U.S. Cl.
CPC ............ *H01Q 1/3275* (2013.01); *H01Q 9/40* (2013.01); *H01Q 13/02* (2013.01); *H01Q 21/24* (2013.01); *H04B 7/10* (2013.01)

(58) Field of Classification Search
CPC ........ H01Q 1/3275; H01Q 9/40; H01Q 13/02; H01Q 21/24; H01Q 1/12; H01Q 1/36; H01Q 1/50; H01Q 21/00; H01Q 21/0006; H04B 7/10
See application file for complete search history.

(56) References Cited

U.S. PATENT DOCUMENTS 4,700,196 A * 10/1987 Campbell ............ H01Q 25/001
  343/820
5,038,152 A *  8/1991 Wong .................... H01Q 19/08
  343/834

(Continued)

FOREIGN PATENT DOCUMENTS

EP  1744470  1/2007
EP  3002826  4/2016

(Continued)

OTHER PUBLICATIONS

Extended European Search Report for Appln. No. 16185041 dated Feb. 7, 2017.

*Primary Examiner* — Hai V Tran
*Assistant Examiner* — Bamidele A Immanuel
(74) *Attorney, Agent, or Firm* — McAndrews, Held & Malloy, Ltd.

(57) ABSTRACT

As a non-limiting example, various aspects of this disclosure provide embodiments of antenna apparatus using monocone antennas for wireless communication.

20 Claims, 3 Drawing Sheets

(56) References Cited

U.S. PATENT DOCUMENTS

| | | | |
|---|---|---|---|
| 6,268,834 B1* | 7/2001 | Josypenko | H01Q 21/28 343/773 |
| 8,519,897 B2* | 8/2013 | Duzdar | H01Q 1/3275 343/715 |
| 10,840,585 B2 | 11/2020 | Jamaly | |
| 2004/0041736 A1* | 3/2004 | Kwon | H01Q 19/08 343/773 |
| 2004/0155821 A1* | 8/2004 | Ohara | H01Q 9/0407 343/700 MS |
| 2006/0055612 A1* | 3/2006 | Kim | H01Q 13/10 343/795 |
| 2006/0071867 A1* | 4/2006 | Quagliaro | H01Q 3/08 343/705 |
| 2006/0187134 A1* | 8/2006 | Hoshi | H01Q 9/40 343/773 |
| 2006/0262019 A1* | 11/2006 | Kuroda | H01Q 1/38 343/773 |
| 2007/0013593 A1* | 1/2007 | Zafar | H01Q 1/3275 343/700 MS |
| 2007/0216595 A1* | 9/2007 | Hashiyama | H01Q 9/40 343/848 |
| 2009/0237314 A1* | 9/2009 | Lalezari | H01Q 21/10 343/773 |
| 2010/0283684 A1* | 11/2010 | Rabinovich | H01Q 5/371 343/700 MS |
| 2011/0001679 A1* | 1/2011 | Meharry | H01Q 13/08 343/859 |
| 2011/0298669 A1* | 12/2011 | Rao | H01Q 1/243 343/893 |
| 2011/0304508 A1* | 12/2011 | Remez | H01Q 13/02 342/442 |
| 2012/0044119 A1* | 2/2012 | Libonati | H01Q 9/28 29/601 |
| 2012/0176286 A1* | 7/2012 | Amert | H01Q 9/28 343/773 |
| 2015/0145741 A1* | 5/2015 | Moulder | H01Q 1/525 343/773 |
| 2015/0280317 A1* | 10/2015 | Morin | H01Q 9/28 343/795 |
| 2015/0349425 A1* | 12/2015 | Kitchener | H01Q 13/18 343/860 |
| 2016/0006114 A1* | 1/2016 | Jamaly | H01Q 9/40 343/789 |
| 2018/0108972 A1* | 4/2018 | Park | H01Q 5/30 |
| 2018/0241124 A1* | 8/2018 | Jamaly | H01Q 5/55 |

FOREIGN PATENT DOCUMENTS

| | | | | |
|---|---|---|---|---|
| EP | 3089265 | | 11/2016 | |
| JP | 2011091557 A | * | 5/2011 | H01Q 1/12 |
| JP | 2017069608 A | * | 4/2017 | H01Q 1/32 |

* cited by examiner

ANTENNA SYSTEM

CROSS-REFERENCE TO RELATED APPLICATIONS/INCORPORATION BY REFERENCE

This patent application is a continuation of application Ser. No. 17/034,021 filed Sep. 28, 2020, which is a continuation of application Ser. No. 15/680,371 filed Aug. 18, 2017 (now U.S. Pat. No. 10,840,585), which makes reference to, claims priority to, and claims benefit from European patent application EP16185041.7, filed on Aug. 19, 2016, and titled "Antenna System," which is hereby incorporated herein by reference in its entirety.

BACKGROUND

Certain embodiments of the disclosure relate to communication equipment and more specifically to an antenna system.

Limitations and disadvantages of conventional and traditional approaches will become apparent to one of skill in the art through comparison of such systems with some aspects of the present disclosure as set forth in the remainder of the present application with reference to the drawings.

SUMMARY

The present disclosure discloses an antenna system, substantially as shown in and/or described below, for example in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1A:
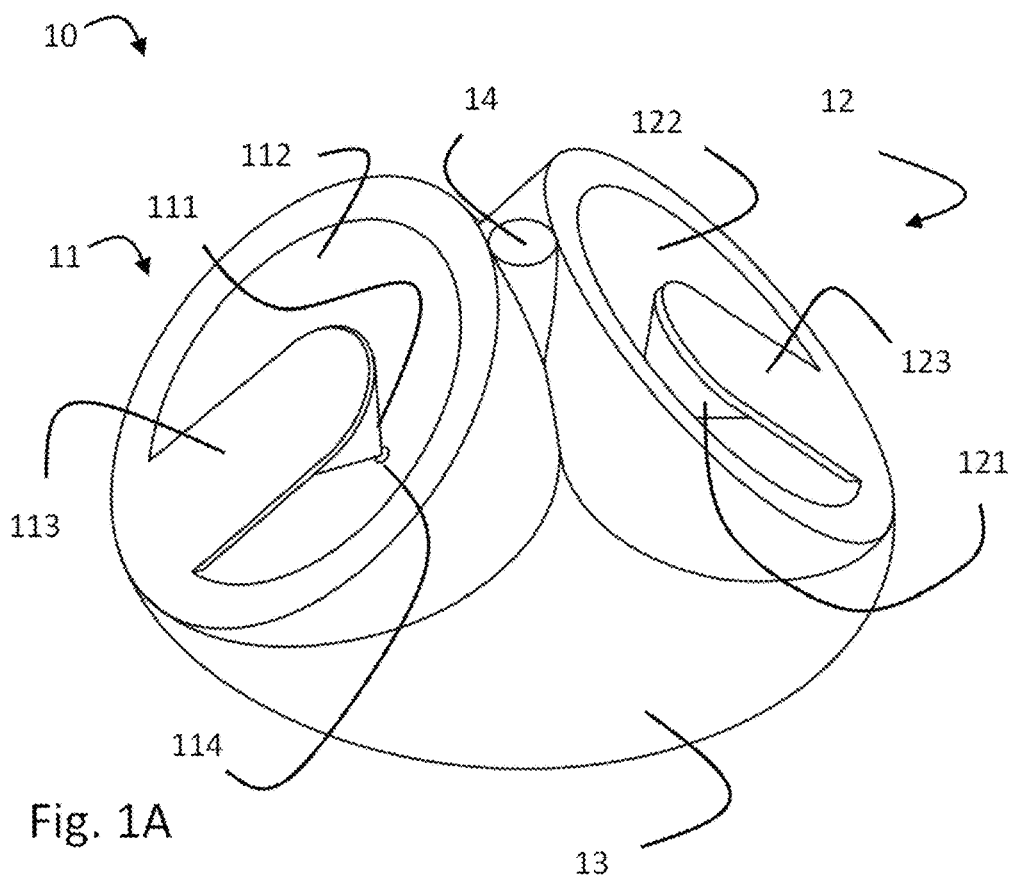
FIGS. 1A-1C are various views of an example antenna system, in accordance with various exemplary aspects of this disclosure.

Various example embodiments of the disclosure will be described in detail with reference to the accompanying drawings such that they can be made and used by those skilled in the art.

Various aspects of the present disclosure may be embodied in many different forms and should not be construed as being limited to the example embodiments set forth herein. Rather, these example embodiments of the disclosure are provided so that this disclosure will be thorough and complete and will convey various aspects of the disclosure to those skilled in the art.

The terminology used here is for the purpose of describing particular embodiments only and is not intended to limit the disclosure. In the drawings, the thickness, width, length, size, etc., of layers, areas, regions, components, elements, etc., may be exaggerated for clarity. Like reference numerals refer to like elements throughout.

As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations.

Also, the singular forms are intended to include the plural forms as well, unless the context clearly indicates otherwise. It will be further understood that the terms "comprises," "comprising," "includes," and/or "including," when used in this specification, specify the presence of stated features, numbers, steps, operations, elements, and/or components, but do not preclude the presence or addition of one or more other features, numbers, steps, operations, elements, components, and/or groups thereof.

In addition, it will be understood that when an element A is referred to as being "connected to" or "coupled to" an element B, the element A can be directly connected to or coupled to the element B, or an intervening element C may be present between the elements A and B so that the element A can be indirectly connected to or coupled to the element B.

Furthermore, although the terms first, second, etc., may be used to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "upper," "lower," "side," and the like, may be used for ease of description to describe the relationship of one element or feature to another element(s) or feature(s) as illustrated in the figures. It will be understood that the spatially relative terms are intended to encompass different orientations of the device in use or operation in addition to the orientation depicted in the figures. For example, if the device in the figures is turned upside-down, elements described as "below" or "beneath" other elements or features would then be oriented "above" the other elements or features. Thus, the exemplary term "below" can encompass both an orientation of above and below.

The widespread use of mobile communication devices for wireless data communication may make it challenging for manufacturers and operators of telecommunications networks to provide users with wireless data communication having their desired bandwidth and broadband capacity. In particular, issues related to communication may arise in use scenarios related to transportation. For example, a base station may not be able to satisfactorily service passengers on a passing train who may attempt to use broadband data communication services. This may be in part because there is a smaller window of time for providing services as trains travel at faster cruising speeds.

Accordingly, an example embodiment of the disclosure may be a communication system, comprising an antenna system with a first monocone antenna and a second monocone antenna mounted on a base structure, where each of the first monocone antenna and the second monocone antenna comprises a monocone with a central axis, a conical recess, and a suspension structure. The monocone may be suspended in the conical recess by the suspension structure in each of the first monocone antenna and the second monocone antenna, and the central axis of the first monocone antenna may be at an angle in the range of substantially 70 degrees to substantially 110 degrees with respect to the central axis of the second monocone antenna. The conical recess is a frusto-conical recess.

The suspension structure may comprise an electrically conductive part covering either a first section of a bottom half of the conical recess or a second section of a top half of the conical recess. When the electrically conductive part covers the first section of the bottom half of the conical recess, the electrically conductive part may be centered in the plane spanned by the central axis of the first monocone antenna and the central axis of the second monocone antenna. The electrically conductive part may leave at least the top half of the conical recess uncovered. The electrically conductive part and the conical recess may also be DC-connected.

The antenna system may also comprise a geographical location system antenna located between the first monocone antenna and the second monocone antenna, and the antenna system may be configured to operate in the GHz spectrum.

The base structure may be configured to be mounted onto a substantially flat metal surface such as, for example, the roof of a vehicle. The base structure may be configured to be mounted such that an antenna system central axis, which is substantially half way between the central axis of the first monocone antenna and the central axis of the second monocone antenna, may be perpendicular to the substantially flat metal surface.

In a non-limiting, exemplary embodiment, the base structure may be configured to be mounted such that the antenna system exhibits polarization-diversity in a first plane orthogonal to a travel path of the vehicle and pattern-diversity in a second plane parallel to the travel path of the vehicle. The antenna system may accordingly be configured to communicate with a first communication system via radiated cross-polarized signals substantially directed along the travel path of the vehicle by using the polarization-diversity in the first plane, and communicate with a second communication system via radiated signals orthogonal to the travel path of the vehicle by using the pattern-diversity in the second plane.

Another example embodiment of the disclosure may be a method for communication that comprises forming an antenna system by mounting a first monocone antenna and a second monocone antenna on a base structure, where each of the first monocone antenna and the second monocone antenna may comprise a monocone with a central axis, a conical recess, and a suspension structure. The monocone may be suspended in the conical recess by the suspension structure in each of the first monocone antenna and the second monocone antenna and the central axis of the first monocone antenna may be at an angular range of substantially 70 degrees to substantially 110 degrees with respect to the central axis of the second monocone antenna.

The conical recess may be, for example, a frusto-conical recess. The suspension structure may comprise an electrically conductive part covering either a first section of a bottom half of the conical recess or a second section of a top half of the conical recess, and the electrically conductive part and the conical recess are DC-connected.

The method may also comprise selecting parameters for the antenna system to configure the antenna system to operate in the GHz range. In a non-limiting, exemplary embodiment, the antenna system may be mounted on a roof of a vehicle such that the antenna system exhibits polarization-diversity in a first plane orthogonal to a travel path of the vehicle and pattern-diversity in a second plane parallel to the travel path of the vehicle. Accordingly, the antenna system may be used in communicating with one or both of a first communication system via radiated cross-polarized signals substantially directed along the travel path of the vehicle by using the polarization-diversity in the first plane; and a second communication system via radiated signals orthogonal to the travel path of the vehicle by using the pattern-diversity in the second plane.

Another example embodiment of the disclosure may be a vehicle comprising a metal roof with an antenna system mounted on the metal roof, where the antenna system may comprise a base structure and two monocone antennas mounted on the base structure. A respective monocone of each of the two monocone antennas may be suspended within a respective conical recess by a respective suspension structure, and a first central axis of a first of the two monocones may be at an angular range of substantially 70 degrees to substantially 110 degrees to a second central axis of the second of the two monocones These and other aspects, advantages, and novel features of the present embodiments, as well as details of an illustrated example embodiment thereof, will be more fully understood from the following description and drawings.

Figure 1B:
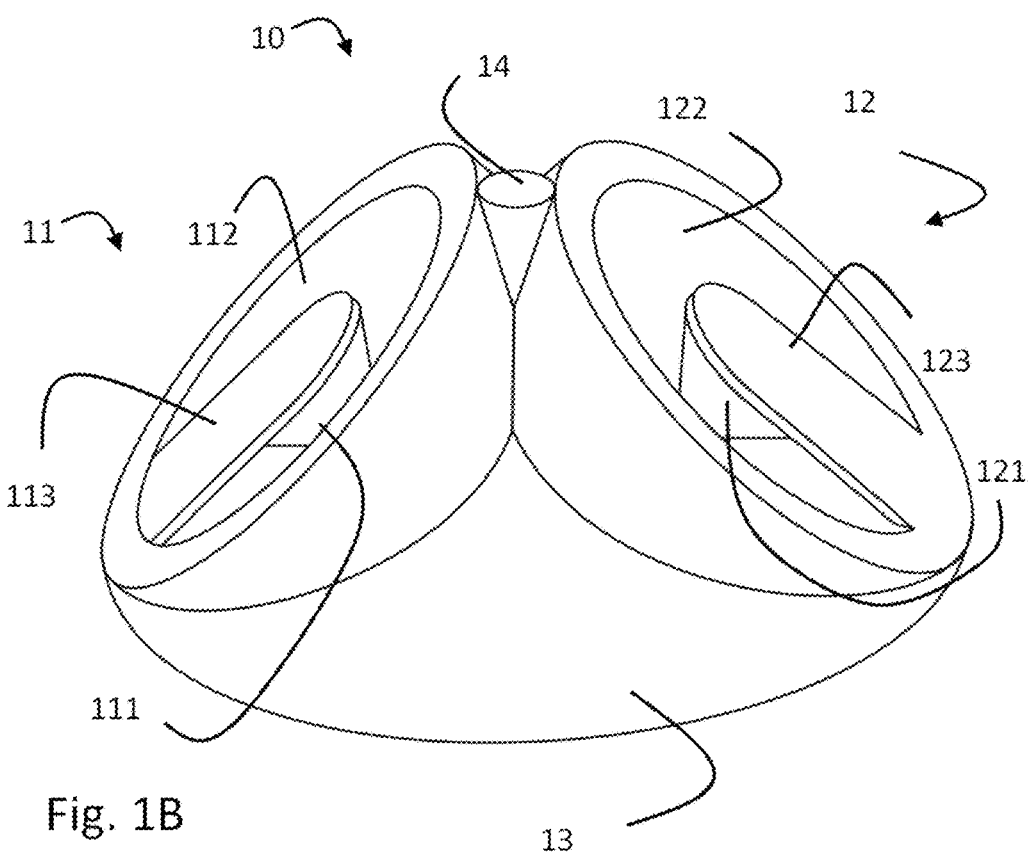
Figure 1C:
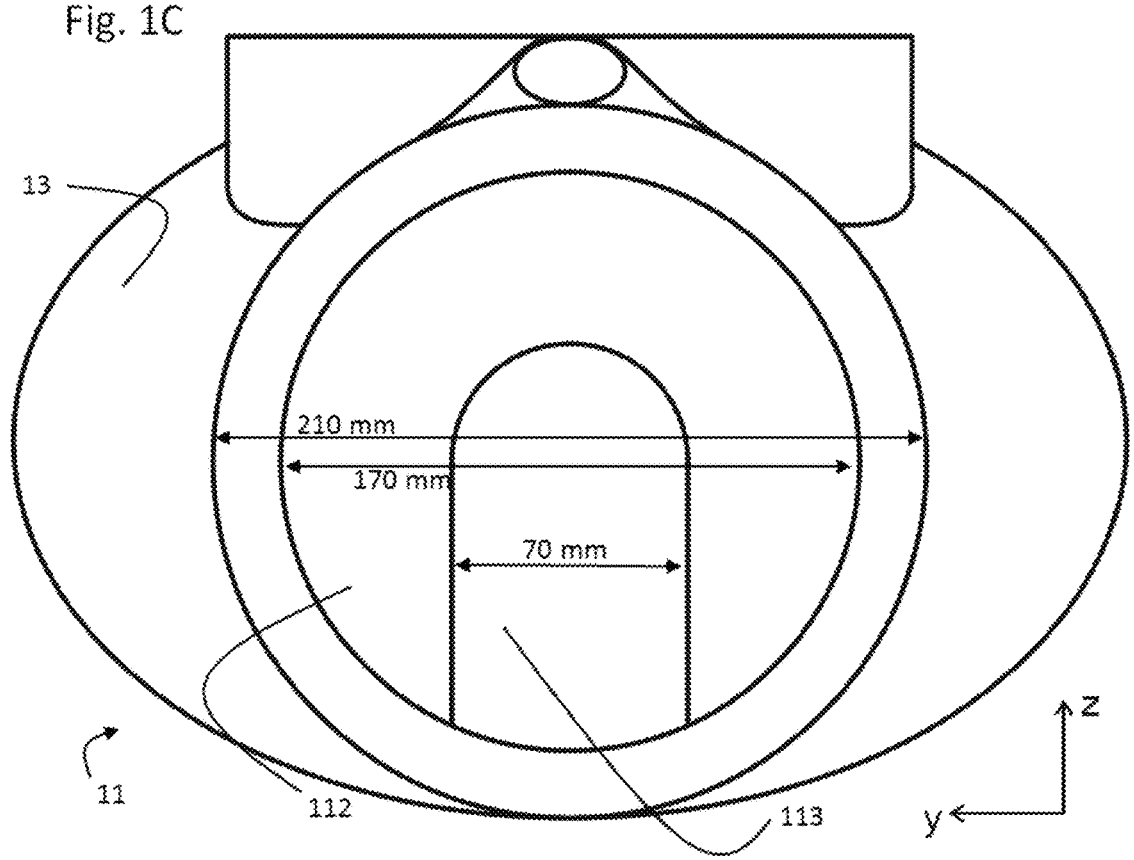

FIGS. 1A-1C are various views of an example antenna system, in accordance with various aspects of this disclosure. FIGS. 1A, 1B, and 1C show different views of the example antenna system 10. The antenna system 10 includes two monocone antennas 11, 12 mounted onto a raised base structure 13. The monocone-type antenna is further described in the published European patent application EP3002826 A1, which is also assigned to the Applicant of this disclosure.

The angular arrangement of the two monocone antennas provides an antenna system with polarity and pattern diversity. The radiation pattern of such an antenna system may be less influenced by large metal surfaces such as, for example, the roof of a train. Various embodiments of the disclosure may also disclose antenna systems with different configurations for the two monocone antenna.

A monocone antenna 11/12 may comprise a monocone 111/121 suspended in a conically shaped recess 112/122 (also called shell). The monocones may be suspended from a suspension structure 113/123 such as, for example, a lever or an arm, extending from its circumference across a segment of the recess 112/122. A feeding point 114 may be arranged at or near the tip of each monocone 111/121. In one example embodiment, the two monocone antennas 11 and 12 may be formed to be similar.

Each conical recess 112/122 may have an opening defined by the borders of the recess 112/122 defining the base surface of the cone. In one example embodiment, the form of the opening may be circular. Each conical recess 112/122 may have a central axis defined as the axis extending through the (in the case of a frusto conical recess virtual) tip of the conical recess 112/122 and through the center point of the opening. In another example embodiment, the central axis of the conical recess 112/122 may be perpendicular to the surface of the opening. In one example embodiment, the conically shaped recess 112/122 may be a frusto-conically shaped recess 112/122. That is, the recess is a conical recess with a cut off tip having an interior base plane. In one example embodiment, the tip is cut off in the plane perpendicular to the central axis of the conical recess 112/122. That is, the interior base surface is perpendicular to the central axis of the conical recess. In one example embodiment, the tip may be cut off in the plane perpendicular to the central axis of the cone 111/121. The diameter of the interior base surface may be one parameter for the impedance and/or frequency of the monocone antenna 11/12. The conical recess or its surface may also be made of an electrically conductive material such as, for example, a metal. The conical recess 112/122 may be electrically connected, for example, to a ground conductor. In an example embodiment, the ground connector may be arranged coaxially around the feeding point 114.

Each monocone 111/121 may have a base surface and a lateral or conical surface. In one example embodiment, the base surface may have a circular form. Each monocone 111/121 may have a central axis, where the central axis may be defined as the axis extending through the tip of the monocone 111/121 and through the center point of the base surface. In one example embodiment, the central axis of the monocone 111/121 may be perpendicular to the base surface. In the example embodiments shown in FIGS. 1A-1C, the monocone may be right circular. In one example embodiment, the monocone 111/121 and the conical recess may be arranged coaxially such that the central axis of the monocone 111/121 may correspond to the central axis of the conical recess 112/122. In one example embodiment, the base surface of the monocone 111/121 may be parallel to the plane of the opening of the conical recess 121/122 or in the same plane as the opening of the conical recess 121/122. The monocone or its surface may be made of an electrically conductive material such as, for example, a metal. The tip of the monocone 111/121 may be connected to the feeding point 114.

In one example embodiment, the suspension structure 113/123 may be a lever or an arm extending from the conical recess 112/122 to the monocone 111/121. In one example embodiment, the lever or arm may extend from the circumferential edge of the opening of the conical recess 112/122 to the base surface of the monocone 111/112. The suspension structure 113/123 may electrically connect, for example, the base surface of the monocone 111/121 with the circumferential edge of the conical recess to achieve a DC ground connection. In one example embodiment, the lever or arm may conduct currents up to, for example, 40 kA (kilo Ampere) over the suspension structure. In one example embodiment, the lever may be arranged in the bottom half of the antenna system 10 or in the top half of the antenna system 10.

Each of the feeding points 114 may be connected in operation to an apparatus (not shown) providing a signal for transmission or detecting signals received by the antenna system 10. An additional element 14, which may be, for example, an antenna for a geographical location system (GPS, etc.), may be positioned in a space between the two recesses 112 and 122. Accordingly, the element 14 may be located, for example, at the top of the base structure 13 to contribute to an overall compact structure of the antenna system 10. However, it should be understood that the antenna systems may be designed and/or operated without the element 14.

As shown, the two monocone antennas 11, 12 are mounted onto the base structure 13 at an angle with respect to each other where, for example, the central axes of the monocones 111, 121 may provide an angular orientation of the monocone antennas 11, 12 with respect to each other. The angle may be in the range of substantially 70 to 110 degrees, for example, including in the range of substantially 75 to 105 degrees, and in the range of substantially 85 to 95 degrees. It may be appreciated that the exact angle between the two antennas 11, 12 may be determined based on an optimization process taking into account, for example, desired signal separation, total height of the antenna system 10, and other mechanical constraints.

The indications "bottom" or "low" and "top" shall be defined as a bottom and a top direction of a central axis of the antenna system 10 arranged in between the central axes of the monocones 111, 121. That is, the central axis of the antenna system 10 forms the same angle with each of the central axis of the monocones 111 and 121. The bottom direction of the central axis of the antenna system 10 refers to the direction in which the central axes of the monocones 111, 121 converge. The top direction of the central axis of the antenna system 10 refers to the direction in which the central axes of the monocones 111, 121 diverge.

The side wall angle of the recess 112/122 and the side wall angle may be part of the parameters used to achieve a desired impedance of the antenna 11/12, such as, for example, 50 Ohms or 75 Ohms.

The monocones 111, 121, the recesses 112, 122, and suspension structures 113, 123 may be made, for example, at least partly of an electrically conductive material. The recesses 112, 122, and/or suspension structures 113, 123 may, for example, form a common or DC ground of each of the antennas 11 and 12.

As shown in the FIGS. 1A-1C, the suspension structures 113, 123 may be shaped such that at least the electrically conductive parts of each suspension structure 113/123 may extend across at least a section of the total opening of a recess 112/122. In particular, this section may be located at the bottom half of the recess or at the top half of the recess. If the section covers a central part of the bottom half of a recess 112/122, the radiation pattern or beam characteristic of the antennas 11, 12 may be directed more parallel to a horizontal plane, assuming the antenna system 10 is mounted horizontally. Under the same mounting situation, the beam characteristic of the antennas 11, 12 may be directed more toward the vertical plane, if the section covers a central part of the top half of a recess 112/122.

In particular, to achieve a more horizontal radiation pattern or beam characteristic, the suspension structures 113, 123 may be shaped such that they cover a section of the bottom half of each of the recesses 112, 122, and particularly a section centered at the lowest point of the circumference of the recesses 112, 122. The section may span, for example, less than substantially +/−45 degrees. Other embodiments may have different spans such as, for example, less than substantially +/−30 degrees, or less than substantially +/−20 degrees around the lowest point of the circumference of the recesses 112, 122. It may be noted that the span angle may vary for different embodiments.

Further, the distal end of each of the suspension structures 113, 123 may extend to the monocone 111/121 it is designed to hold. However, the distal end may terminate essentially at the edge or within the base area of the monocone as mentioned before, and, hence, the distal end may not extend beyond the base area of the monocone. Thus, the suspension structures 113, 123 may be designed to prevent forming a cover over any area of the upper sections of the recesses 112, 122 that are not already covered by the respective monocone 111/121 itself.

Similarly, by replacing the words "bottom half" with the words "top half" in the preceding paragraph, a more vertical radiation pattern or beam characteristic may be achieved.

It may be appreciated that any of the above described geometrical limits of the suspension structure apply to the electrically conductive parts of the suspension structure. The other areas of the recess may be covered by parts of suspension structure made of a radiation-transparent material. In particular, the suspension structures 113, 123 may be embedded into or be parts of lids completely covering the total area of the recesses 112, 122. Such an embodiment may alleviate the need to cover the antenna structure with a radome cover, which otherwise may be required to provide extra environmental protection and/or aerodynamically favorable shapes.

In operation, the recess 112, 122 and the conductive parts of the suspension structure 113, 123 may be DC connected to ground. This may provide resilience against a high current short circuit. For example, some countries may mandate being able to tolerate 40 kA short circuits in the metallic roofs of train cars. The signal received by the antenna system 10 may be conducted to input amplifier/driver circuits via the feeding point 114 using, for example, a co-axial conductor. Similarly, signals to be transmitted by the antenna system 10 may be provided by the output amplifier/driver circuits via, for example, a co-axial conductor, to the feeding point 114.

Each monocone antenna 11/12 may operate as an antenna with a single polarization. Together the pair of monocone antennas 11, 12 of the antenna system 10 may operate as an antenna system 10 for cross-polarized signals or as a two-part antenna for MIMO systems.

Each monocone antenna 11/12 may operate as an antenna with a directive pattern. Together, the pair of monocone antennas 11, 12 of the antenna system 10 may operate as an antenna system 10 with good pattern diversity. The top plane view of antenna 11 as shown in FIG. 1C, may be used to illustrate that the antennas are cross-polarized in the xz-plane (but co-polarized in the xy-plane and the yz-plane) and have full pattern diversity in the yz-plane, where the x-axis is directed out of the paper plane.

Together the pair of antennas 11, 12 may operate as an antenna system 10 for cross-polarized signals and with good pattern diversity in two different planes.

Each of these characteristics may be advantageous for application as an antenna system for vehicles such as, for example, for the roofs of trains or buses or other vehicles that may have roof mounted antennas and electrical connectors. These characteristics may provide advantageous for applications such as, for example, where a vehicle enters antenna corridors that alternate between a line-of-sight cross-polarized signal transmission along the track of the vehicle above roof level and signal transmission using leaky feeder cables located along one or both sides of the track. Such systems are described, for example, in the European patent application 15165768 "ANTENNA SYSTEM FOR VEHICLES" filed on Apr. 29, 2015.

In the first case when a line-of-sight cross-polarized signal is present, the antenna system 10 may operate as an antenna system for cross-polarized signals. When the general transmission direction is from the side of tracks such as, for example, from a base station located on one or both sides of the track or from a leaky feeder antenna corridor, the pattern diversity of the antenna system 10 may enable discriminating signals received from the left side and the right side of the vehicle. In some example embodiments, several antenna systems 10 may be installed, for example, on one or more car roofs of a train and connected via a switching system to increase the coverage provided with a full MIMO transmission link.

Referring now particularly to FIG. 1C, there is shown a top view of one of the monocone antennas 11 mounted on the base structure 13 with a frusto-conically shaped recess 112 and a suspensions structure 113 overlaying the monocone 111, which is not visible. Also shown are examples of parameters such as, for example, an inner diameter of the circumference of the conical recess 112 of 170 mm and a width of the conductive part of the suspension structure 113 and an outer diameter of the monocone (not visible) of 70 mm.

Several performance parameters of the antenna system 10 can be modelled as shown in the following FIGS. 2 and 3. The Cartesian tripod in the bottom right corner of FIG. 1C indicates an assumed orientation of the antenna system with the base structure resting on the x-y plane (the paper plane) and antenna 11 being oriented at an angle between the x-y plane and the (vertical) z-direction.

Figure 2:
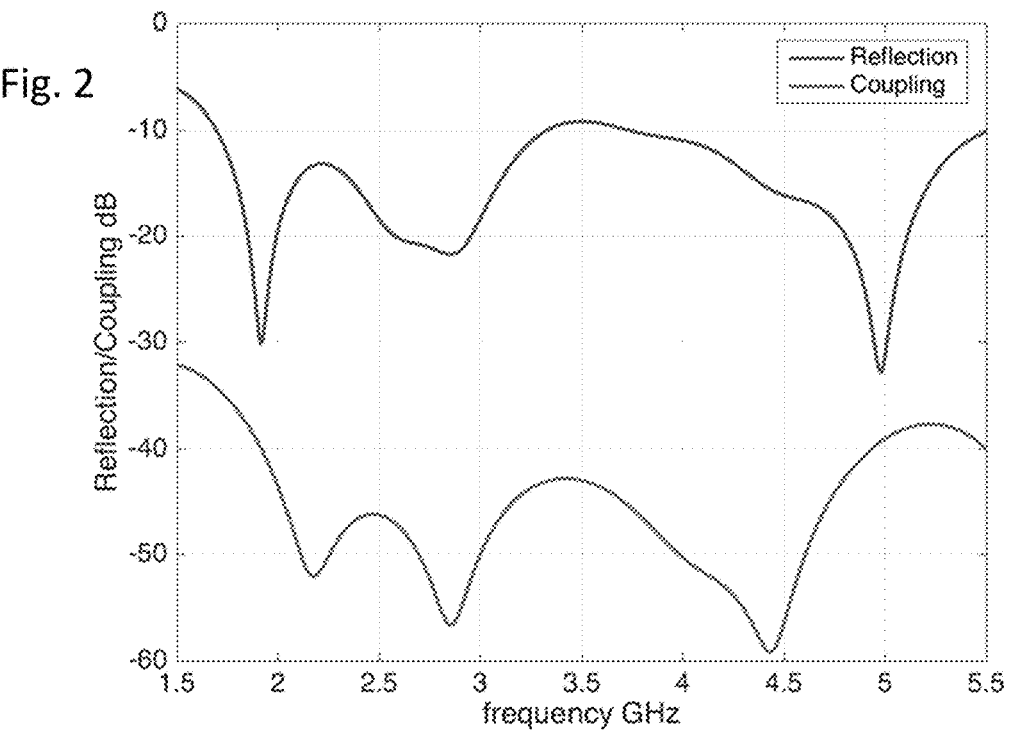
FIG. 2 shows a reflection/coupling versus frequency diagram of the example antenna system of FIG. 1, in accordance with various exemplary aspects of this disclosure.

FIG. 2 shows a reflection/coupling versus frequency diagram of the example antenna system of FIG. 1, in accordance with various aspects of this disclosure. Referring to FIG. 2, there is shown the return losses of each of the antennas 11, 12 (top curve) and the port coupling (bottom curve) between them in dB. The return losses are below −10 dB across a spectrum from 1700 MHz to 5500 Mhz. The peak return loss at around 3500 MHz may be addressed by additional tuning. Across the same spectral range the port isolation is continuously below −35 dB.

Figure 3:
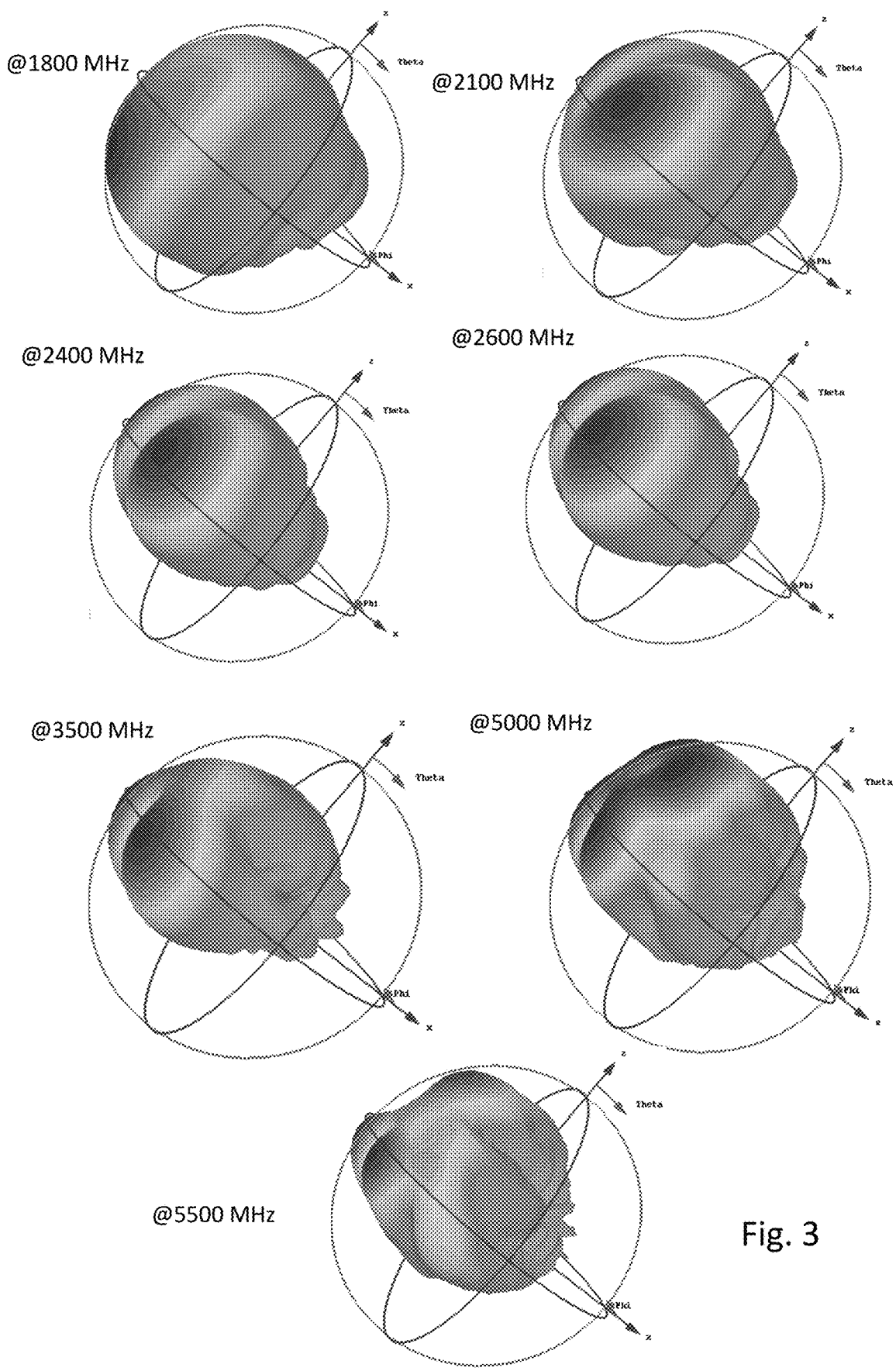
FIG. 3 illustrates EM radiation patterns across a bandwidth of the example antenna system of FIG. 1, in accordance with various exemplary aspects of this disclosure.

FIG. 3 illustrates EM radiation patterns across a bandwidth of the example antenna system of FIG. 1, in accordance with various aspects of this disclosure. Referring to FIG. 3, there is shown the EM pattern for the monocone antenna 11 at seven frequencies between 1800 MHz and 5500 MHz. The x direction is indicated by an arrow pointing towards the bottom right corner of the plot and the (orthogonal) z-direction is indicated by an arrow pointing towards the top right corner of each plot. When the antenna system is installed, for example, on a flat metal roof, the x-direction corresponds to a direction of the central axis of the monocone 111 of the monocone antenna 11 and hence will be at an angle from the horizontal plane of the roof. The antenna is oriented at −45 degrees from the z-direction corresponding to antenna 11 in FIGS. 1A and 1B. The EM patterns show that at most frequencies two lobes are in predominantly horizontal direction.

These and other simulations indicate that the matching, port isolation, and general EM pattern of the antenna may be maintained essentially irrespective of the presence of an extended ground plane such as, for example, a flat metal roof. This port isolation may be enhanced or reduced by selecting the wall thickness of the frustro-conical recess accordingly.

The EM patterns with respect to frequency may further indicate that the antenna may be configured and operated as an ultra-wideband antenna in the GHz spectrum, particularly within the range from 1700 MHz to 5500 MHz. Furthermore, the antenna may show full polarization diversity in a first plane and full pattern diversity in a second plane orthogonal to the first plane. That is, in a non-limiting, exemplary embodiment, the antenna may exhibit polarization-diversity in a first plane orthogonal to a travel path of the vehicle and pattern-diversity in a second plane parallel to the travel path of the vehicle. Accordingly, the antenna may be used to communicate with a first communication system via radiated cross-polarized signals substantially directed along the travel path of the vehicle by using the polarization-diversity in the first plane, and to communicate with a second communication system via radiated signals orthogonal to the travel path of the vehicle by using the pattern-diversity in the second plane.

The simulations further indicate that the antenna system 10 may exhibit little to no spatial correlation between the ports in a uniform multipath environment.

As the base structure such as, for example, a flat metal roof, may be shown to have no significant influence on the EM performance of the antenna system 10, the antenna system 10 may be further optimized with respect to mechanical and/or aerodynamic constraints. The base structure may be used to give the whole antenna system a "tilting" angle away from the strictly vertical orientation to further adapt the antenna system to the signal transmission systems along the track.

In case the suspension structure is made of metal, the antenna system 10 may be designed as a full-metal construction, i.e., with no dielectric or non-linear parts, which may also reduce the risk of passive intermodulation.

Accordingly, in accordance with various aspects of this disclosure, examples of the networks and/or components thereof presented herein are provided in the European patent application EP16185041.7, filed on Aug. 19, 2016, and titled "Antenna System," which is hereby incorporated herein by reference in its entirety.

As described, various antenna systems are provided that may be suitable, for example, for installation on roofs of vehicles. The antenna system may comprise, for example, two monocone antennas mounted on a base structure, where the monocone of each monocone antenna may be suspended within a conical recess by a suspension structure. The two monocone antennas may be arranged on the base structure at an angle in a range of substantially 70 to 110 degrees to each other such that the system may have a polarization-diversity in a first plane and a pattern-diversity in a second plane orthogonal to the first plane.

While various embodiments of the disclosure have been described above, it should be understood that they have been presented as non-limiting examples only. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A communication system, comprising:
   an antenna system comprising:
      a base structure;
      a first monocone antenna mounted on the base structure, wherein a monocone is suspended in a conical recess of the first monocone antenna by a suspension structure, and wherein the suspension structure extends from a circumferential edge of the conical recess without extending across the conical recess;
      a second monocone antenna mounted on the base structure; and
      an additional antenna located between the first monocone antenna and the second monocone antenna, wherein a central axis of the first monocone antenna is at an angle in a range of substantially 70 degrees to substantially 110 degrees with respect to a central axis of the second monocone antenna.

2. The communication system according to claim 1, wherein the second monocone antenna comprises a monocone with a conical recess and a suspension structure.

3. The communication system according to claim 1, wherein the conical recess is a frusto-conical recess.

4. The communication system according to claim 1, wherein the suspension structure comprises an electrically conductive part covering either a first section of a bottom half of the conical recess or a second section of a top half of the conical recess.

5. The communication system according to claim 4, wherein when the electrically conductive part covers the first section of the bottom half of the conical recess, the electrically conductive part is centered in a plane spanned by the central axis of the first monocone antenna and the central axis of the second monocone antenna.

6. The communication system according to claim 5, wherein the electrically conductive part leaves at least the top half of the conical recess uncovered.

7. The communication system according to claim 4, wherein the electrically conductive part and the conical recess are DC-connected.

8. The communication system according to claim 1, wherein the antenna system is configured to operate in a GHz spectrum.

9. The communication system according to claim 1, wherein the base structure is configured to be mounted onto a substantially flat metal surface.

10. The communication system according to claim 9, wherein the base structure is configured to be mounted such that an antenna system central axis, which is substantially half way between the central axis of the first monocone antenna and the central axis of the second monocone antenna, is perpendicular to the substantially flat metal surface.

11. The communication system according to claim 9, wherein the substantially flat metal surface is a roof of a vehicle.

12. The communication system according to claim 11, wherein the base structure is configured to be mounted such that the antenna system exhibits polarization-diversity in a first plane orthogonal to a travel path of the vehicle and pattern-diversity in a second plane parallel to the travel path of the vehicle.

13. The communication system according to claim 12, wherein the antenna system is configured to:
   communicate with a first communication system via radiated cross-polarized signals substantially directed along the travel path of the vehicle by using the polarization-diversity in the first plane; and
   communicate with a second communication system via radiated signals orthogonal to the travel path of the vehicle by using the pattern-diversity in the second plane.

14. A method for communication, comprising:
   mounting a first monocone antenna and a second monocone antenna on a base structure, wherein a monocone is suspended in a conical recess of the first monocone antenna by a suspension structure, and wherein the suspension structure extends from a circumferential edge of the conical recess without extending across the conical recess; and mounting an additional antenna between the first monocone antenna and the second monocone antenna, wherein a central axis of the first monocone antenna is at an angle in a range of substantially 70 degrees to substantially 110 degrees with respect to a central axis of the second monocone antenna.

15. The method according to claim 14, wherein the conical recess is a frusto-conical recess.

16. The method according to claim 14, wherein the suspension structure comprises an electrically conductive part covering either a first section of a bottom half of the conical recess or a second section of a top half of the conical recess, and the electrically conductive part and the conical recess are DC-connected.

17. The method according to claim 14, comprising selecting parameters for the antenna system to configure the antenna system to operate in a GHz spectrum.

18. The method according to claim 14, comprising mounting the antenna system on a roof of a vehicle such that the antenna system exhibits polarization-diversity in a first plane orthogonal to a travel path of the vehicle and pattern-diversity in a second plane parallel to the travel path of the vehicle.

19. The method according to claim 18, comprising communicating with one or both of:
a first communication system via radiated cross-polarized signals substantially directed along the travel path of the vehicle by using the polarization-diversity in the first plane; and
a second communication system via radiated signals orthogonal to the travel path of the vehicle by using the pattern-diversity in the second plane.

20. A vehicle comprising:
a metal roof with an antenna system mounted on the metal roof, wherein the antenna system comprises:
a base structure;
two monocone antennas mounted on the base structure, wherein a monocone is suspended in a conical recess of one of the monocone antennas by a suspension structure, and wherein the suspension structure extends from a circumferential edge of the conical recess without extending across the conical recess; and
an additional antenna located between the first monocone antenna and the second monocone antenna, wherein a central axis of a first monocone antenna is at an angle in a range of substantially 70 degrees to substantially 110 degrees with respect to a central axis of a second monocone antenna.

* * * * *